United States Patent [19]

Jacobson, Jr.

[11] 4,163,973
[45] Aug. 7, 1979

[54] MEANS FOR DEVELOPING A RADAR TRACKING ERROR SIGNAL

[75] Inventor: Robert E. Jacobson, Jr., Los Angeles, Calif.

[73] Assignee: The United States of America as represented by the Secretary of the Air Force, Washington, D.C.

[21] Appl. No.: 549,402

[22] Filed: Feb. 18, 1975

[51] Int. Cl.² .............................................. G01S 9/22
[52] U.S. Cl. .................................................. 343/16 M
[58] Field of Search .................................... 343/16 M

[56] References Cited
U.S. PATENT DOCUMENTS

| 3,229,287 | 1/1966 | Hovda | 343/16 M |
| 3,579,239 | 5/1971 | Purcell et al. | 343/16 M |

Primary Examiner—T. H. Tubbesing
Attorney, Agent, or Firm—Joseph E. Rusz; Willard R. Matthews, Jr.

[57] ABSTRACT

A tracking radar error signal that is independent of pulse to pulse variations of amplitude of the received signal is derived by combining separately detected sum signal energy and difference signal energy in a manner that provides composite error signal pulses that are one-half sum signal energy and one-half sum plus difference signal energy. The pulse composition is realized by means of an RF switch that interrupts the difference signal during approximately one-half of each pulse period. The composite error signal is detected by an IF logarithmic detector and subsequently processed by two parallel box car generators. One box car generator is gated to process sum signal energy and the other is gated to process sum plus difference signal energy. The tracking error signal is obtained from a single pulse by feeding the outputs of the two box car generators to a differential amplifier and obtaining the difference voltage at its output.

1 Claim, 1 Drawing Figure

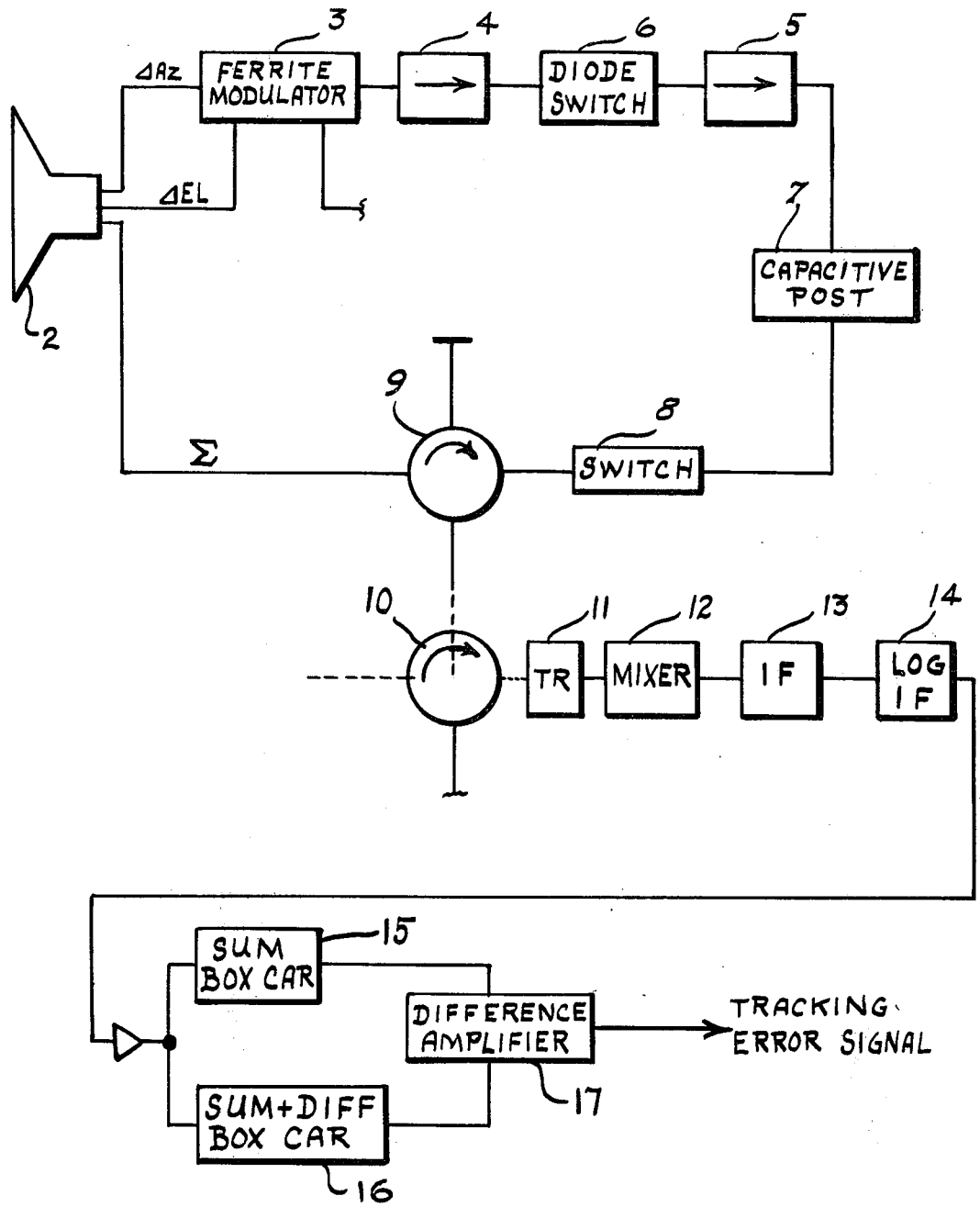

MEANS FOR DEVELOPING A RADAR TRACKING ERROR SIGNAL

STATEMENT OF GOVERNMENT INTEREST

The invention described herein may be manufactured and used by or for the Government for governmental purposes without the payment of any royalty thereon.

BACKGROUND OF THE INVENTION

This invention relates to tracking radars, and in particular to means for eliminating degrading effects due to pulse to pulse variations of amplitude of received signals in sequentially lobed and conical scan tracking systems.

Tracking radar systems measure the coordinates of a target and provide data which may be used to determine the target path and predict its future position. The antenna beam in the tracking radar is positioned in angle by a servomechanism actuated by an error signal. The various methods for generating the error signal are classified as sequential lobing, conical scan, and simultaneous lobing or monopulse. Sequentially lobed and conical scan systems must process multiple received pulses (at least four) in order to determine target positions. The accuracy of this type of system is severely degraded if the amplitude of any received pulse is varied due to any factor other than lobing. Monopulse systems determine target position from a single returned signal pulse and are thus not subject to this source of error. Monopulse systems are, however, much more complex and have rigid channel matching requirements. Monopulse systems have been developed that eliminate channel matching through the use of single signal channel processing. This technique unfortunately introduces further problems associated with injecting lengthy delays (in terms of wavelengths) in the receiver to permit ordinary time sharing of a single signal channel.

The present invention is directed toward achieving single pulse derivation of tracking error signals without the normal complexity and channel matching requirements of a full monopulse system and without the time sharing problems of single signal channel processing.

SUMMARY OF THE INVENTION

The invention comprehends a pulsed tracking radar system having an antenna that provides separate sum and difference received signals. The signals are combined at RF in such a manner that each pulse comprises only sum signal energy for one-half of its period and sum plus difference signal energy for the remaining one-half of its period. The pulses are subsequently processed at IF and detected by an IF logarithmic detector. The output of the logarithmic detector is processed by parallel box car generators, one gated to sum signal energy only and the other gated to sum plus difference signal energy. A difference amplifier measures the tracking error signal from the outputs of the two box car generators.

It is a principal object of the invention to provide new and improved means for developing a radar tracking error signal.

It is another object of the invention to provide means for developing a radar tracking error signal that is independent of extraneous received signal pulse to pulse variations in amplitude.

It is another object of the invention to provide means for achieving single pulse derivation of tracking error signals without the normal complexity and channel matching requirements of a monopulse radar system.

These, together with other objects, features and advantages of the invention will become more readily apparent from the following detailed description when taken in conjunction with the sole figure of the accompanying drawing.

DESCRIPTION OF THE DRAWING

The sole FIGURE of the drawing is a block diagram of one presently preferred embodiment of the invention.

DETAILED DESCRIPTION OF THE PREFERRED EMBODIMENT

The present invention falls within the general class of sequentially lobed tracking radar systems. It is predicated, however, on the use of a lob-on-receive antenna which is a monopulse type antenna in that it has separate sum and difference signals. These signals are added at RF to give a single composite received signal to the receiver.

The invention is most advantageously applied to radar systems that use a conical scan technique. In operation, the conically scanned signal is generated while in the receiver mode by appropriate RF processing of sum and difference signals derived from a monopulse type feed horn. The tracking error signal, as subsequently extracted, is usable only as a conical scan derived signal and is processed in the conventional manner for such systems.

The sole figure of the drawing is a block diagram of this type of system incorporating various additional elements comprehended by the invention. Referring to the figure, the antenna circuit comprises monopulse feed horn 2, ferrite modulator 3, isolators 4, 5 didoe switch 6, capacitive post 7, switch 8, and circulator 9. The receiver circuit comprises circulator 10, transmit-receive switch 11, mixer 12, IF processing circuits 13, IF logarithmic detector 14, box car generators 15, 16 and difference amplifier 17. The new elements that give effect to the invention consist of isolator 4, diode switch 6, IF logarithmic detector 14, sum box car generator 15, sum and difference box car generator 16, and difference amplifier 17. The remaining components of the block diagram and others not shown are integral parts of conventional tracking radar circuits. These circuits and the functions of the herein illustrated and other necessary tracking error signal processing components are described in detail in the publication. *Introduction to Radar Systems*, by M. I. Skolnik, McGraw Hill 1962, pp 165–184.

In operation, appropriate switch action by diode switch 6 modifies the desired received pulse to contain sum signal energy only for approximately one-half of the pulse and added sum and difference signal energy during the balance of the pulse. It is essential that the switching time of the diode be short compared to the pulse length (in the order of 5 to 10 percent), to ensure the best possible tracking error recovery.

Although linear signal processing can occur after such processing of the signal, the initial detection of a video signal must be accomplished in a log IF strip (logarithmic detector 14). The dynamic range of the log IF must be sufficient to handle the anticipated range of amplitude of received signals without excessive log slope variations. In fact, uniformity of log slope is of critical importance in maintaining proper antenna tracking loop gain; the more usual logging "linearity" requirement is of only secondary importance.

The video signal is then fed to two box car generators 15, 16. One, box car generator 15, is gated to develop a box car signal from that portion of the received pulse derived only from sum signal energy. The other, box car generator 16, develops a signal from the composite (sum plus difference) received signal.

From the sum signal box car generator, an agc voltage can be derived to control the gain of linear circuits preceding the log IF.

Recovery of the tracking error signal (unresolved in azimuth and elevation) is completed by feeding the outputs of the two box car generators to differential amplifier 17, and obtaining the difference voltage at its output.

While the invention has been described in one presently preferred embodiment, it is understood that the words which have been used are words of description rather than words of limitation, and that changes within the purview of the appended claim may be made without departing from the scope and spirit of the invention in its broader aspects.

What is claimed is:

1. In combination with a pulsed tracking radar having an antenna adapted to provide separate sum and difference received signals a circuit for deriving tracking error signals comprising
   signal combining means connected to said antenna for combining received sum signal energy and difference signal energy into discrete composite error signal pulses,
   a diode switch connected between said signal coupling means and said antenna having actuating characteristics that permit the input of difference signal energy to said signal combining means during approximately one-half of each error signal pulse period only,
   a logarithmic detector connected to receive the output of said signal combining means,
   a differential amplifier, and
   first and second box car generators connected in parallel between said logarithmic detector and said differential amplifier, said first box car generator being gated to develop an output signal in response to sum signal energy only and said second box car generator being gated to develop an output signal in response to composite sum plus difference signal energy only.

* * * * *